US011120468B2

(12) United States Patent
Motoyama

(10) Patent No.: US 11,120,468 B2
(45) Date of Patent: *Sep. 14, 2021

(54) INFERRING INTERACTIONS WITH ADVERTISERS

(71) Applicant: Google LLC, Mountain View, CA (US)

(72) Inventor: Ken Lee Motoyama, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/900,075

(22) Filed: Jun. 12, 2020

(65) Prior Publication Data

US 2020/0302474 A1    Sep. 24, 2020

Related U.S. Application Data

(63) Continuation of application No. 16/048,462, filed on Jul. 30, 2018, now Pat. No. 10,719,846, which is a continuation of application No. 13/171,893, filed on Jun. 29, 2011, now Pat. No. 10,049,377.

(51) Int. Cl.
*G06Q 30/00* (2012.01)
*G06Q 30/02* (2012.01)

(52) U.S. Cl.
CPC ..... *G06Q 30/0242* (2013.01); *G06Q 30/0254* (2013.01); *G06Q 30/0277* (2013.01)

(58) Field of Classification Search
CPC .......... G06Q 30/0242; G06Q 30/0254; G06Q 30/0207–0277
USPC ......... 705/14.41, 14.51, 14.52, 14.68, 14.73; 715/808, 844; 713/150
See application file for complete search history.

(56) References Cited

U.S. PATENT DOCUMENTS

| | | | | |
|---|---|---|---|---|
| 5,948,061 A | * | 9/1999 | Merriman .......... | G06Q 30/0264 709/219 |
| 7,130,808 B1 | * | 10/2006 | Ranka .............. | G06Q 10/06315 705/14.43 |
| 7,257,546 B2 | * | 8/2007 | Ebrahimi ............... | G06Q 30/02 705/14.73 |
| 7,406,434 B1 | * | 7/2008 | Chang .............. | G06Q 10/06375 705/14.43 |
| 7,996,521 B2 | * | 8/2011 | Chamberlain ..... | G06Q 30/0201 709/224 |
| 2002/0004733 A1 | * | 1/2002 | Addante ............ | G06Q 30/0253 705/14.51 |

(Continued)

OTHER PUBLICATIONS

Mair, Patrick, et al. "Analysis of Dwell Times in Web Usage Mining." University of Vienna, Jan. 2007. (Year: 2007).*

*Primary Examiner* — Luis A Brown
(74) *Attorney, Agent, or Firm* — Fish & Richardson P.C.

(57) ABSTRACT

This specification describes technologies relating to inferring interactions with advertisers. In general, one aspect of the subject matter described in this specification can be embodied in methods that include providing an online advertisement to a system, receiving data from the system indicating an interaction of the system with the online advertisement and data indicating a subsequent interaction of the system with an online resource of an advertiser associated with the online advertisement, and inferring that an advertisement conversion has occurred based on the received data. Other embodiments of this aspect include corresponding systems, apparatus, and computer program products.

20 Claims, 6 Drawing Sheets

(56) References Cited

U.S. PATENT DOCUMENTS

| | | | |
|---|---|---|---|
| 2002/0072965 A1* | 6/2002 | Merriman | G06Q 30/0257 705/14.49 |
| 2003/0105681 A1 | 6/2003 | Oddo | |
| 2005/0222987 A1* | 10/2005 | Vadon | G06F 16/907 |
| 2005/0235030 A1* | 10/2005 | Lauckhart | G06Q 30/0277 709/200 |
| 2005/0240557 A1* | 10/2005 | Rorex | G06Q 30/0275 |
| 2005/0273440 A1* | 12/2005 | Ching | G06Q 20/20 705/64 |
| 2006/0069614 A1 | 3/2006 | Agarwal et al. | |
| 2007/0038516 A1* | 2/2007 | Apple | G06Q 30/02 705/14.42 |
| 2007/0073585 A1* | 3/2007 | Apple | G06Q 40/00 705/14.46 |
| 2007/0129999 A1* | 6/2007 | Zhou | G06Q 30/0248 705/14.47 |
| 2007/0244746 A1* | 10/2007 | Issen | G06Q 30/02 705/14.53 |
| 2007/0288394 A1* | 12/2007 | Carrott | G06Q 20/12 705/78 |
| 2008/0033790 A1* | 2/2008 | Nickerson | G06Q 30/0203 705/7.32 |
| 2008/0320119 A1* | 12/2008 | Achan | H04L 29/12783 709/222 |
| 2009/0125444 A1* | 5/2009 | Cochran | G06Q 30/0264 705/50 |
| 2010/0049602 A1* | 2/2010 | Softky | G06Q 30/0246 705/14.45 |
| 2010/0161492 A1* | 6/2010 | Harvey | G06Q 30/0246 705/50 |
| 2010/0313009 A1* | 12/2010 | Combet | H04L 67/22 713/150 |
| 2011/0029376 A1* | 2/2011 | Mills | G06Q 30/0244 705/14.43 |
| 2011/0173089 A1* | 7/2011 | Tan | G06Q 20/29 705/26.7 |
| 2012/0030037 A1* | 2/2012 | Carriero | G06Q 30/0277 705/14.73 |
| 2013/0066786 A1* | 3/2013 | Joyce | G06Q 20/3823 705/71 |

* cited by examiner

INFERRING INTERACTIONS WITH ADVERTISERS

CROSS-REFERENCE TO RELATED APPLICATION

This application is a continuation application of U.S. application Ser. No. 16/048,462, filed Jul. 30, 2018, which is a continuation application of U.S. application Ser. No. 13/171,893, now U.S. Pat. No. 10,049,377, filed Jun. 29, 2011. The disclosure of each of the foregoing applications is incorporated herein by reference.

TECHNICAL FIELD

This document relates generally to inferring interactions between a user of an online medium and an advertiser using that online medium to display advertisements to the user.

BACKGROUND

Web pages are often displayed with advertisements relating to the web pages. For example, if a user is viewing a web page relating to a particular topic, the user may be interested in products and services also relating to that topic. An online advertising service can provide a way for advertisers to display advertisements to those users. Often, the online advertising service requests data from the advertisers about which advertisements are successful. This information may be used by the online advertising service to generate statistical information about the advertisements and their effectiveness.

SUMMARY

In general, one aspect of the subject matter described in this specification can be embodied in a method that includes providing an online advertisement to a system, receiving from the system data indicating an interaction of the system with the online advertisement and data indicating a subsequent interaction of the system with an online resource of an advertiser associated with the online advertisement, and inferring that an advertisement conversion has occurred based on the received data. Other implementations of this aspect include corresponding systems, apparatus, and computer program products.

These and other implementations can each optionally include one or more of the following features. The occurrence of the advertisement conversion can be inferred based on stored statistics describing system interaction with online resources. The interaction of the system with the online advertisement can include requesting a web page. The occurrence of the advertisement conversion can include a transaction with the advertiser. The transaction with the advertiser can include a commercial transaction. The received data indicating the subsequent interaction of the system with the online resource can include an identification of an encrypted communication with the online resource. The received data indicating the subsequent interaction of the system with the online resource can include an identification of an amount of time during which the system communicated with the online resource. The received data wherein the received data indicating the subsequent interaction of the system with the online resource can include an identification of an amount of information communicated between the system and the online resource. The data can be received by an online advertising service and the system can include software provided by the online advertising service. The online resource of the advertiser can include a web site of the advertiser. The system can include a web browser. Inferring that an advertisement conversion has occurred can be performed absent information provided by the advertiser indicating that the conversion has occurred. Inferring that an advertisement conversion has occurred based on the received data can include generating an inferred conversion rate for the advertisement. The aspect can include selecting the advertisement for display based on the inferred conversion rate of the advertisement.

In general, another aspect of the subject matter described in this specification can be embodied in a system that includes an advertisement service system configured to provide online advertisements to systems, means for receiving data from the systems indicating interactions of the systems with the online advertisements and data indicating subsequent interactions of the systems with online resources of advertisers associated with respective online advertisements; and a data processing apparatus configured to infer that advertisement conversions have occurred based on the received data.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Advertisers buy advertising space on online media including Web sites and Internet search portals. The online format allows for automatic tracking of advertisement statistics. An online advertising service can compile these statistics to determine how often the advertisements are given user attention (for example, clicked on in a Web browser), and to determine how many advertisements lead to a commercial transaction (or other end result desired by an advertiser).

Once a user clicks on an advertisement, the online advertisement service may not have direct involvement with the user's interaction leading up to a commercial transaction. For example, the user may be led to the Web site of the advertiser and access product information, service descriptions, and may eventually decide to make a transaction. Although the online advertisement service can record the number of times an advertisement has been clicked, the rate at which an advertisement has been clicked does not necessarily correlate to how often the click leads to a transaction. The online advertising service can determine statistics about these transactions if the advertiser provides data about"

the transactions or allows the online advertising service to access or control portions of the advertiser's Web site. Alternatively, the advertiser can choose to opt out of providing any data or access to the advertising service. Instead the advertising service can estimate statistics based on data supplied by the user rather than the advertiser. Thus, the techniques described here provide for one or more advantages. For example, the rate of conversions achieved by advertisements can be determined in the absence of statistics or other information provided by an advertiser. As another example, advertisers can opt out of providing statistics or information to an advertisement service. Not every embodiment described herein realizes all of the advantages listed here, and some embodiments may realize none of them.

Figure 1:
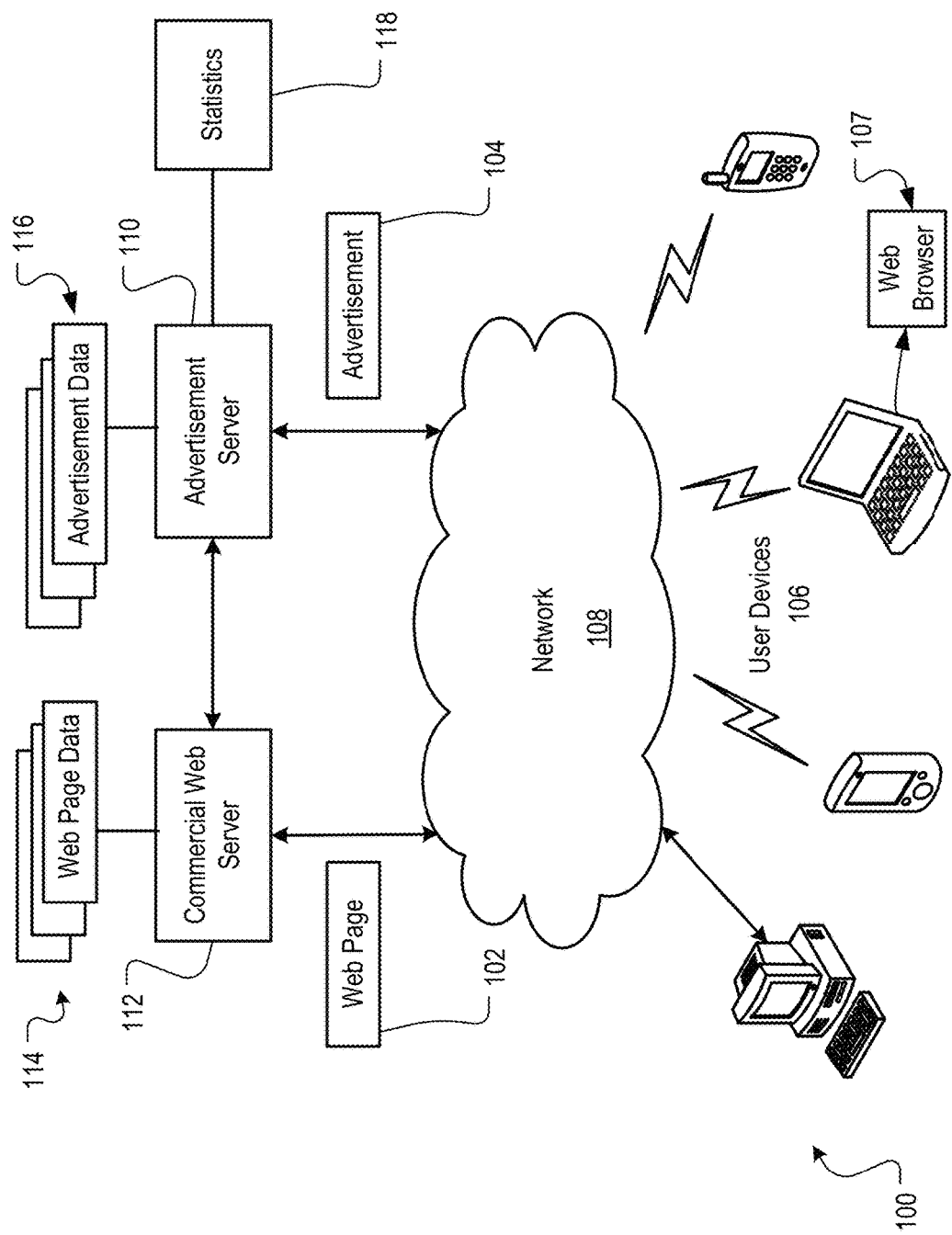
FIG. 1 is a block diagram of an online environment for inferring user interaction with advertisers.

FIG. 1 is a block diagram of an online environment 100 for inferring user interaction with advertisers. The online environment 100 facilitates the delivery of web pages 102 and advertisements 104 to user devices 106 using a network 108. For example, a user device 106 can display web pages 102 and advertisements 104 using software such as a web browser 107.

A web page 102 can be provided by a web server such as a commercial web server 112. For example, the web page 102 can be generated by the commercial web server 112 from web page data 114 available to the commercial web server 112 (e.g., residing in data storage available to the commercial web server 112). A commercial web server 112 includes functionality for using the network 108 to facilitate commercial transactions or transactions related to commercial transactions. For example, the commercial web server 112 may have functionality to handle a user's purchase of goods and services or functionality to receive or process online payments. In some implementations, the functionality includes functionality for conducting secure transactions such as encrypted transactions, for example, SSL (secure socket layer) functionality.

In some examples, the commercial web server 112 facilitates transactions that are similar to commercial transactions but not traditionally commercial in nature. For example, the commercial web server 112 can facilitate transactions related to non-profit enterprises, such as the solicitation of donations to a charity.

An advertisement 104 provided to a user device 106 can be an advertisement soliciting interest in a product, a service, or anything for which an advertiser wishes to solicit user interest. For example, the advertisement 104 can be generated by the advertisement server 110 from advertisement data 116 available to the advertisement server 110 (e.g., residing in data storage available to the advertisement server 110). In some examples, the advertisement 104 may be provided to another web server and incorporated within a web page. For example, the advertisement 104 can be provided to a web server for providing search results, and the advertisement 104 may be related to those search results. The advertisement 104 can include text, images, audiovisual content, or other kinds of content.

In some examples, the commercial web server 112 is operated by or on behalf of an advertiser, and the advertisement 104 can include a reference (e.g., a hyperlink) to the commercial web server 112. When the advertisement 104 is provided to a user device 106 (e.g., for display on the web browser 107), the advertisement 104 solicits the user's interest by directing the user to the commercial web server 112. If the user indicates interest, for example, by clicking on a hyperlink, then the commercial web server 112 can provide one or more web pages 102 providing information related to the advertisement 104. For example, the commercial web server 112 can offer more information about a product or service, or offer the opportunity to purchase the product or service.

In general, an advertiser operating the commercial web server 112 has provided the information contained within the advertisement 104 with the goal of ultimately causing a commercial event, such as a purchase of a product or service, to occur. The event need not be a commercial transaction, but could also be another desired action such as a user inquiry about the product or service. The event could also be something else besides a transaction. Generally, these events are known as "conversions."

The advertisement server 110 may be operated by an advertisement intermediary such as an advertising service. For example, an advertiser operating the commercial web server 112 may commission the advertisement intermediary to provide an advertisement to user devices 106. Further, the advertisement intermediary may use the advertisement server 110 to keep track of statistics 118 about which advertisements 104 lead to conversions (i.e., occurrences in which a goal of the advertisement is satisfied). For example, an advertisement server 110 operated by the advertisement intermediary may provide many different advertisements 104 providing references to many commercial web servers 112. If the advertisement server 110 also compiles statistics about which advertisements 104 are successful in leading to a conversion, then the advertisement intermediary can better understand what kind of advertisements are effective and make improvements to its method of advertising, for example.

An advertiser may choose to provide information to an advertisement intermediary about which advertisements 104 succeeded in achieving a conversion that can be used to determine a rate or percentage of advertisements 104 that achieve a conversion. For example, the commercial web server 112 can provide data to the advertisement server 110 about which advertisements 104 succeeded in achieving a conversion. However, in some cases, the advertiser may choose to opt out of providing any such data. The advertisement intermediary (e.g., using the advertisement server 110) can instead infer a rate of conversions based on data supplied by the user devices 106 rather than the commercial web server 112. The inferred rate of conversions can then be used when evaluating the advertisement. In some examples, advertisements are rated according to their conversion rate. An advertisement having a high conversion rate (e.g., relative to an average conversion rate or a conversion rate threshold) may be categorized as a high-quality advertisement because achieving conversions is a primary goal of the advertisement. In contrast, an advertisement having a low conversion rate may be categorized as a low-quality advertisement because the advertisement does not achieve conversions. Therefore, the inferred conversion rate can be used to determine whether the advertisement has a high conversion rate or a low conversion rate. In some examples, advertisements are selected for display (e.g., to users of an online medium) based on the conversion rate. For example, advertisements having a conversion rate above a threshold may be selected for display, and advertisements having a conversion rate below the threshold may not be selected for display. Therefore, the inferred conversion rate can be used to select advertisements for display.

An inferred conversion rate could also be used for other purposes. For example, the performance of advertisements may differ among multiple sites used to publish or distribute advertisements. An inferred conversion rate can be used as a method to equalize the expected return on investment of advertisements across a network of publisher sites. In some examples, the cost of advertising on some publisher sites can be discounted when an inferred number of conversions for those sites is less than on other publisher sites. For example, an advertisement published or displayed on a site about reviewing cameras might result in twice the number of conversions as an advertisement published or displayed on a site that has a photo gallery, even when the advertisement directs users to the same camera retailer page. Thus, the advertiser might only be charged half the cost when advertisements are displayed on the photo gallery page versus the review page.

As another example, some advertisers may prefer to pay for advertisements on a cost per conversion basis or establish an advertisement budget tied to a number of conversions. However, the advertisers may lack the technical expertise to include functionality on their web sites to track conversions. An advertiser could use inferred conversion rates to enable the advertiser to pay for advertisements on a cost per inferred conversion basis or to pay for advertisements in a manner that attempts to maximize inferred conversions, potentially increasing the return on investment of their advertisement campaigns.

Figure 2:
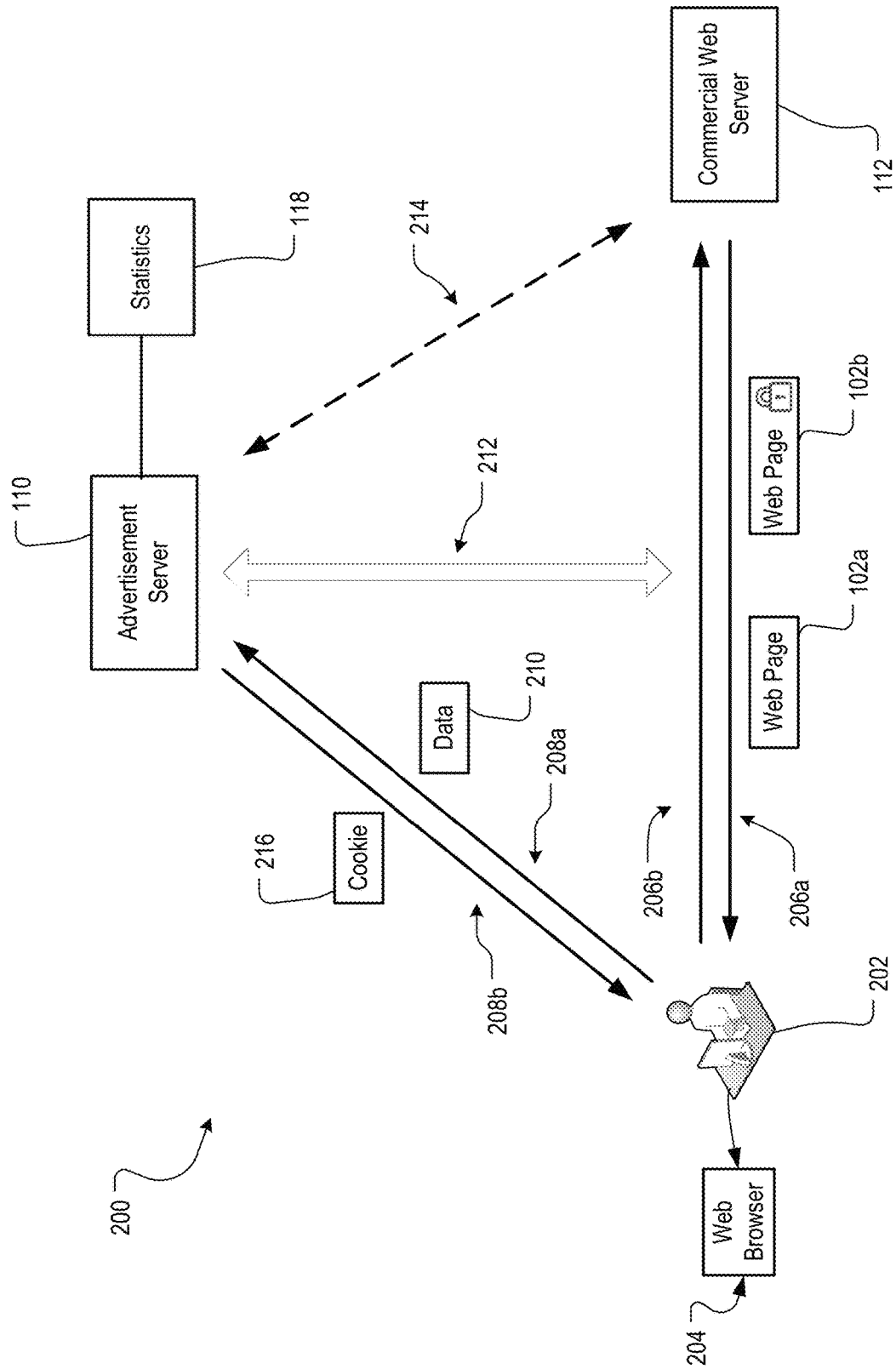
FIG. 2 shows an example interaction.

FIG. 2A shows an example interaction 200. The example interaction 200 is between a user 202, a commercial web server 112, and an advertisement server 110. In this interaction 200, the advertisement server 110 uses data collected at the user's location by the user's web browser 204 to infer data about whether an advertisement has achieved a conversion. The web browser 204 has functionality that allows it to analyze activities of the user 202 based on the way in which the user interacts with the web browser 204. The user 202 can opt to enable the functionality for analyzing the interactions.

The advertisement server 110 can receive information from the web browser 204 about the interaction between the user 202 and the commercial web server 112. The advertisement server 110 can use the received information to observe 212 the interaction between the user 202 and the commercial web server 112 even though the advertisement server 110 is not participating in the interaction between the user 202 and the commercial web server 112 and even though the advertisement server 110 does not communicate 214 directly with the commercial web server 112.

The user 202 receives 206a a web page 102a from the commercial web server 112, for example, in response to the user clicking on a link provided by an advertisement 104 (FIG. 1). When this occurs, the web browser 204 displays the web page 102a and also transmits 208a identification data 210 to the advertisement server 110 indicating that the user 202 is viewing the web page 102a. In some examples, the web browser 204 transmits 208a identification data 210 indicating an address (e.g., a URL) of the web page 102a or data indicating a domain name associated with the web page 102a.

The web browser 204 has functionality that allows it to identify that the user 202 is viewing a web page 102a that originates from the commercial web server 112. For example, the functionality could be a web browser 204 add-on or "plug-in" software package that allows it to communicate the identification data 210 to the advertisement server 110. The user 202 can choose to enable this functionality in the web browser 204 or web browser add-on software package.

Once the user 202 views a web page 102a received from the commercial web server 112, the user 202 may choose to transmit 206b another request for another web page or web pages from the commercial web server 112. For example, the user 202 may have learned about a product or service made available through the commercial web server 112 and has chosen to request a secure web page 102b that allows the user 202 to purchase the product or service. The secure web page 102b may be a web page that includes security features such as encryption. For example, the secure web page 102b may be transmitted 206a to the user 202 using a security communications protocol such as secure sockets layer (SSL) or transport layer security (TLS). The web browser 204 can detect that a secure web page 102b is being delivered using security features and include this information in the data 210 that the web browser 204 transmits 208a to the advertisement server 110. In turn, the advertisement server 110 can evaluate the data 210 to infer information about the interaction between the user 202 and the commercial web server 112.

If the user 202 receives a web page 102a from the commercial web server 112, and then subsequently receives a secure web page 102b from the commercial web server 112, then the user 202 may have engaged in a transaction such as a purchase that corresponds to an advertisement having achieved a conversion. The advertisement server 110 can make inferences about how often advertisements achieve a conversion when this kind of interaction between a user 202 and a commercial server 112 occurs. For example, the advertisement server 110 may have received information from this commercial web server 112 or other web servers that indicate that an advertisement has achieved a conversion a certain percentage of times that a user requests a secure web page 102b. For example, advertisement server 110 may have received information indicating that, on average, fifty percent of requests for secure web page 102b lead to a commercial transaction and thus an advertisement has achieved a conversion. The advertisement server 110 may have received other types of information that it can use to make these inferences. For example, the advertisement server 110 may have received statistical information describing the relationship between a conversion and the amount of time a user spends interacting with a commercial web server, or statistical information describing the relationship between a conversion and the amount of information received by a user from a commercial web server, such as a certain number of web pages provided to the user by the commercial web server. In one example, the statistical information could indicate that if a user has spent more than ten minutes interacting with the commercial web server, there is a 50% chance that the interaction has led to a conversion achieved by the advertisement. In another example, the statistical information could indicate that if a user has received more than ten web pages from the commercial web server, there is a 50% chance that the interaction has led to a conversion achieved by the advertisement. (These are only examples and the actual relationship between the user's activities and a conversion could vary widely depending on the type of advertiser, the type of product or service offered by the advertiser, the time of day of an interaction, characteristics of the user, or other factors.)

The advertisement server 110 receives information indicating how often advertisements achieve a conversion. In some examples, this information can be based on past recorded interactions between commercial web servers and users in which the commercial web servers have provided information to the advertisement server about which interactions achieved a conversion. The interactions between the commercial web servers and the users can be analyzed to learn information about the relationship between the user's activities and a conversion. In some examples, the interactions may have been experimental interactions performed for the purpose of examining the interactions, and in some examples, the interactions may have been actual interactions between potential customers and the commercial web servers.

In another example, the advertisement server 110 can perform a semantic analysis of the URL for a web page being viewed by a user to infer if a conversion has occurred. For example, if the URL contains the words indicative of a transaction, such as "checkout" or "newsletter signup," then the advertisement server 110 may infer that a conversion has occurred. In another example, if the advertisement server 110 has generated an index of a web site hosted on a commercial web server (e.g., generated an index containing some or all of the contents of the web site), the advertisement server 110 could examine the contents of a page that a user is viewing. For example, the advertisement server 110 could identify words (e.g., words contained in an index) that might indicate a conversion has occurred, for example, "Thank you" or "Congratulations" or "Order Confirmation." In another example, the advertisement server 110 may perform a statistical analysis on the average amount of time that users on an advertisement network spend on a site before they convert. The advertisement server 110 may then use time-based analysis to infer if a conversion is likely to have occurred on a site for each instance of an advertisement being clicked.

This statistical information can be used by an advertisement server to determine if an advertisement has likely achieved a conversion. Based on this kind of statistical information, the advertisement server can generate inferences about how many times an advertisement achieves a conversion during interactions with this commercial web server 112 even though in this example the advertisement server 110 receives no information from the commercial web server 112. In other examples, the advertisement server 110 may receive information from the commercial web server 112.

Thus, the advertisement server 110 and commercial server 112 need not have any interaction 214 for the advertisement server 110 to infer the interaction between the user 202 and the commercial web server 112. Put another way, the inference is performed absent information provided by the advertiser indicating that the conversion has occurred. The advertisement server 110 can use the inferred interaction to generate statistics 118 about advertisement effectiveness.

The statistics 118 can include an inferred conversion rate for the advertisement. As an example, the advertisement server 110 may have collected information indicating users (e.g., user 202) were directed to a commercial web server 112 by clicking on a particular advertisement (e.g., advertisement 104). Further, the advertisement server 110 may have collected information indicating that ten of those clicks each have a 50% chance that a subsequent conversion occurred, e.g., by evaluating activities of the user subsequent to each of the ten clicks. The advertisement server 110 may thus infer that, on average, five conversions occurred based on the 50% chance associated with each of the ten clicks. This inference is made by multiplying the probability (50%, or 0.5) by the number of clicks that have a chance of a subsequent conversion (10). If the probability that a subsequent conversion occurred varies among the ten clicks (e.g., if some of the clicks have a have a 30% chance that a subsequent conversion occurred, and some of the clicks have a 70% chance that a subsequent conversion occurred), then the probabilities can each be multiplied by their respective number of clicks, and the results can be summed together to calculate an inferred number of conversions.

Continuing with this example, advertisement server 110 may have collected information indicating that one hundred of the users clicked on the particular advertisement. Thus, the advertisement server 110 can divide the number of inferred conversions (e.g., five) by the total number of clicks (e.g., one hundred) to calculate an inferred conversion rate (e.g., 5%).

Other techniques for inferring a conversion rate can be used. For example, a conversion threshold could be used. In this example, the advertisement server 110 may have collected information indicating users were directed to a commercial web server 112 by clicking on a particular advertisement. Further, the advertisement server 110 may have collected information indicating that ten of those clicks each have a 95% chance that a subsequent conversion occurred, e.g., by evaluating activities of the user subsequent to each of the ten clicks. The advertisement server 110 can be configured with a conversion threshold. If a probability that a conversion occurred exceeds the threshold, the conversion can be inferred as having occurred. In this example, the conversion threshold can be 90%, so that if there is greater than a 90% chance that a conversion has occurred, then the conversion is inferred as having occurred and recorded in the statistics 118 as having occurred. Here, because ten of the clicks each have a 95% chance that a subsequent conversion occurred, the advertisement server 110 can infer that ten conversions occurred.

Continuing with this example, advertisement server 110 may have collected information indicating that one hundred of the users clicked on the particular advertisement. Thus, the advertisement server 110 can divide the number of inferred conversions (e.g., ten) by the number of clicks (e.g., one hundred) to calculate an inferred conversion rate (e.g., 10%).

These are only some examples of calculating an inferred conversion rate, and other methods of inferring a conversion rate can be used. The inferred conversion rate can be used in place of a conversion rate determined by other means. For example, the inferred conversion rate can be used to select an advertisement for display or otherwise evaluate the advertisement based on its conversion rate. In some examples, conversions can be inferred using a simulation that takes in statistics 118 along with dynamic signals, such as the time of day, to determine the likelihood that a given user will convert.

In some implementations, the web browser 204 analyses the interaction between the user 202 and the commercial web server 112, and sends analyzed data to the advertisement server 110 after an interaction has taken place. In some implementations, the web browser 204 sends data to the advertisement server 110 without performing any analysis on the data before sending it.

In some implementations, the advertisement server 110 optionally uses a cookie 216 to determine or infer the user's interaction with the commercial web server 112. A cookie is a piece of data generated by a remote server such as a web server and stored on a user's computer (for example, in association with a web browser) for a period of time. In implementations in which a cookie 216 is used, the cookie 216 may have been stored in association with the web browser 204 of the user 202 when the user 202 requested or clicked on an advertisement and indicates information about the advertisement and the subsequent interaction with the commercial web server 112. In some implementations, the advertisement server 110 can retrieve the cookie 216 from the web browser 204 (for example, when the web browser 204 has enabled access to the cookie 216 for the advertisement server 110) to learn information about the interaction between the user 202 and the commercial web server 112. For example, the cookie 216 could supplement or replace the data 210 transmitted by the web browser 204. In some implementations, data usable by a web browser 204 to create the cookie 216 is generated by the advertisement server 110 and transmitted to the web browser 204. The cookie 216 can be optionally modified by the web browser 204, and then later retrieved by the advertisement server 110. In some implementations, the cookie 216 is accessible to only some web servers based on security features of the cookie 216. In some implementations (sometimes referred to as "first-party cookies"), a cookie 216 generated by the commercial web server 112 may not by accessible by the advertisement server 110, and a cookie 216 generated by the advertisement server 110 may not be accessible by the commercial web server 112. In some implementations, (sometimes referred to as "third-party cookies"), if each server accesses or modifies information stored by the cookie 216, the advertisement server 110 and the commercial web server 112 may interact 214 to allow the advertisement server 110 to access or modify the information.

Figure 3A:
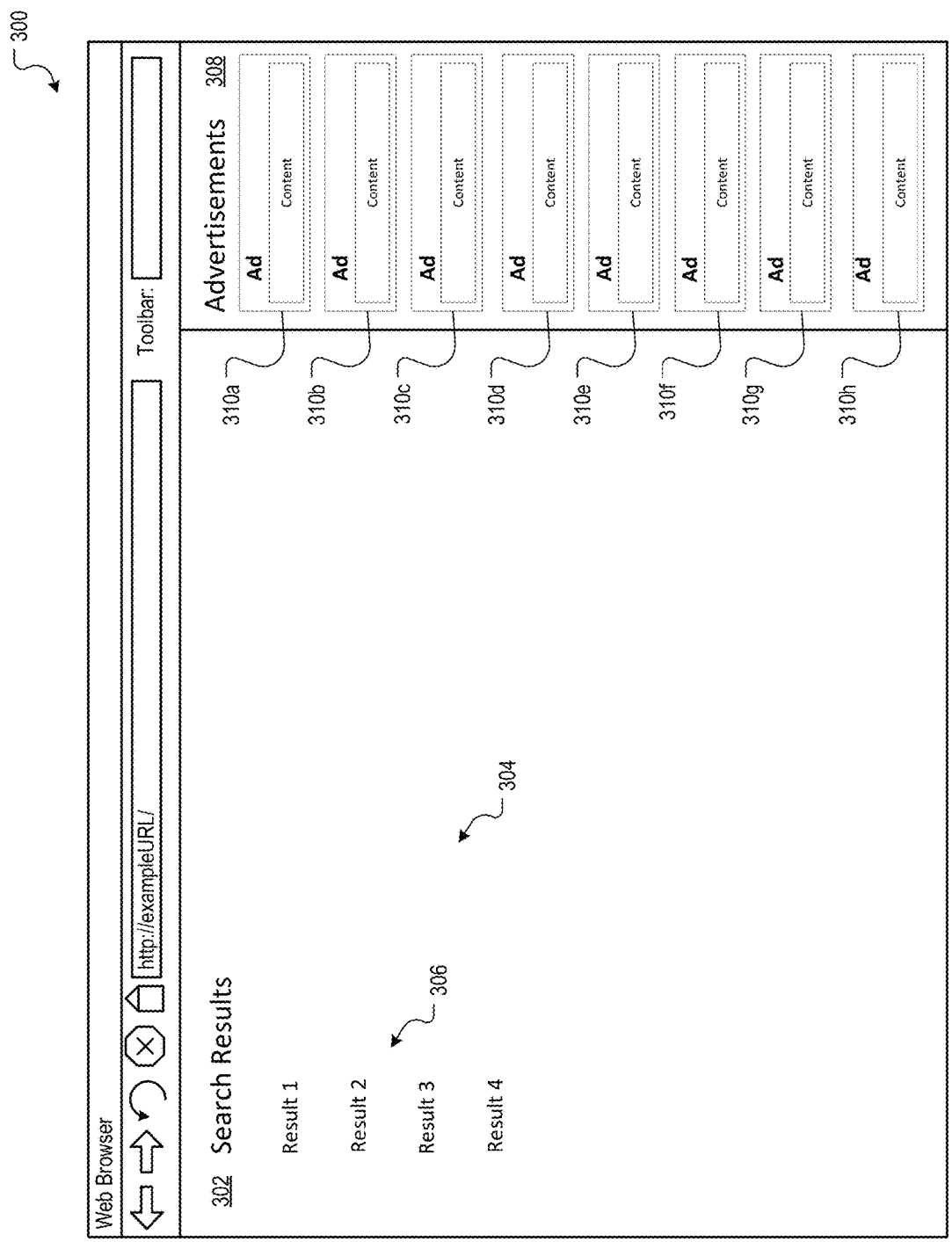
FIG. 3A shows an example of a web browser interface.

FIG. 3A shows an example of a web browser interface 300. For example, the web browser interface 300 could be an interface to the web browser 204 shown in FIG. 2. The web browser interface 300 includes a web page display portion 302 and an advertisement portion 308. In the example shown here, the web page display portion 302 displays a web page 304 provided by a search engine web site that includes search results 306. The advertisement portion 308 displays advertisements 310a-310h, for example, that relate to the search results 306. The advertisements 310a-310h can be provided by an advertisement server (e.g., the advertisement server 110 shown in FIG. 1 and FIG. 2). A user viewing the web browser interface 300 can click on one of the advertisements 310a-310h to be brought to a web page provided by a commercial web server (e.g., the commercial web server 112 shown in FIG. 1 and FIG. 2).

Figure 3B:
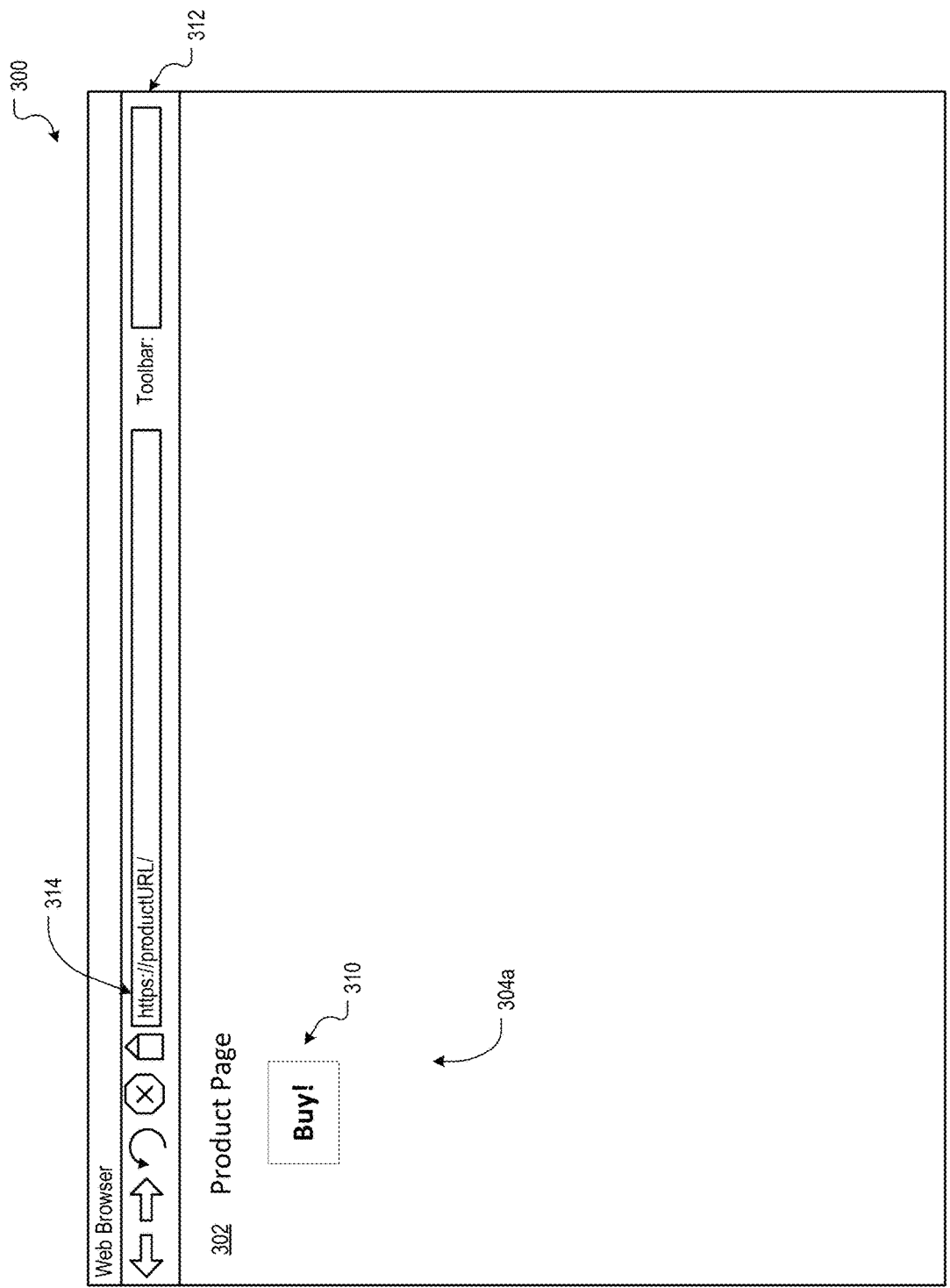
FIG. 3B shows the web browser interface after a user has clicked on an advertisement and interacted with a commercial web server.

FIG. 3B shows the web browser interface 300 after a user has clicked on an advertisement and interacted with a commercial web server. The web browser interface 300 displays a secure web page 304a in the web page display portion 302 providing information about a commercial product. In this example, the secure web page 304a can be identified as secure (i.e., having security features such as encryption) by its URL 314 (uniform resource locator), which indicates that the secure web page 304a is delivered using "https," a secure communications protocol. The secure web page 304a includes a purchase button 310 that allows a user to buy the commercial product.

If the user clicks the purchase button 310 and buys the product, then the advertisement that the user clicked on previously (for example, one of the advertisements 310a-310h shown in FIG. 3A) has achieved a conversion. The advertisement server that provided the advertisement may have no direct communication with the commercial web server providing the secure web page 304a (in a manner similar to the advertisement server 110 and commercial web server 112 shown in FIG. 2). The web browser interface 300 can include add-on software 312 that communicates with an advertisement server. For example, the add-on software can be provided by an online advertisement service that operates the advertisement server. Here, the add-on software 312 is a "toolbar" plug-in providing additional functionality to the web browser interface 300. Although the add-on software 312 does not receive information from the commercial web server providing the secure web page 304a, the add-on software 312 can examine the URL 314 of the secure web page 304a to determine that the user of the web browser interface 300 is viewing a secure web page and thus may be engaging in a transaction from which an advertisement server can infer that an advertisement has achieved a conversion. Thus, an advertisement server can receive information collected at the user's location to determine statistics about which advertisements have achieved a conversion.

Figure 4:
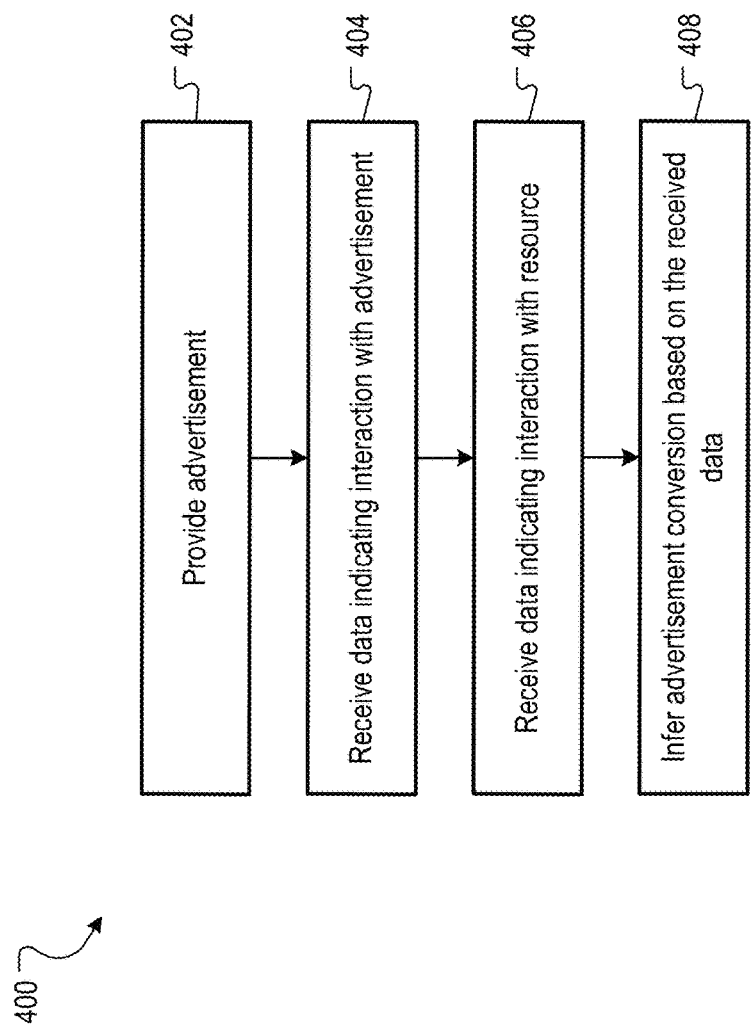
FIG. 4 shows an example process for inferring a user's interaction with an online resource such as a commercial web server

FIG. 4 shows an example process 400 for inferring a user's interaction with an online resource such as a commercial web server. The process can be used by an advertisement server such as the advertisement server 110 shown in FIG. 1 and FIG. 2. The advertisement server provides 402 an advertisement to a system operated by a user. For example, the advertisement can be provided for display in the user's web browser and can include a hyperlink to a commercial web server. The advertisement server receives 404 data from the system indicating an interaction with the advertisement. For example, the advertisement server can receive information indicating that the user has clicked on a hyperlink provided with the advertisement to be brought to a web page provided by a commercial web server operated by an advertiser. The advertisement server receives 406 data indicating interaction with an online advertiser resource such as the commercial web server operated by the advertiser. For example, the advertisement server can receive information provided by a web browser about the user's activities such as whether the user has received a secure web page from the commercial web server, how many web pages provided by the commercial web server the user has viewed, how much time the user has spent viewing web pages provided by the commercial web server, and other information that can be used to infer the user's interaction with the commercial web server. The advertisement server infers 408 an advertisement conversion based on the information provided by the web browser about the user's activities. For example, the advertisement server can use the provided information to infer whether the advertisement clicked on by the user has achieved a conversion (e.g., the purchase of a commercial product or service or other desired end goal of the advertiser).

Figure 5:
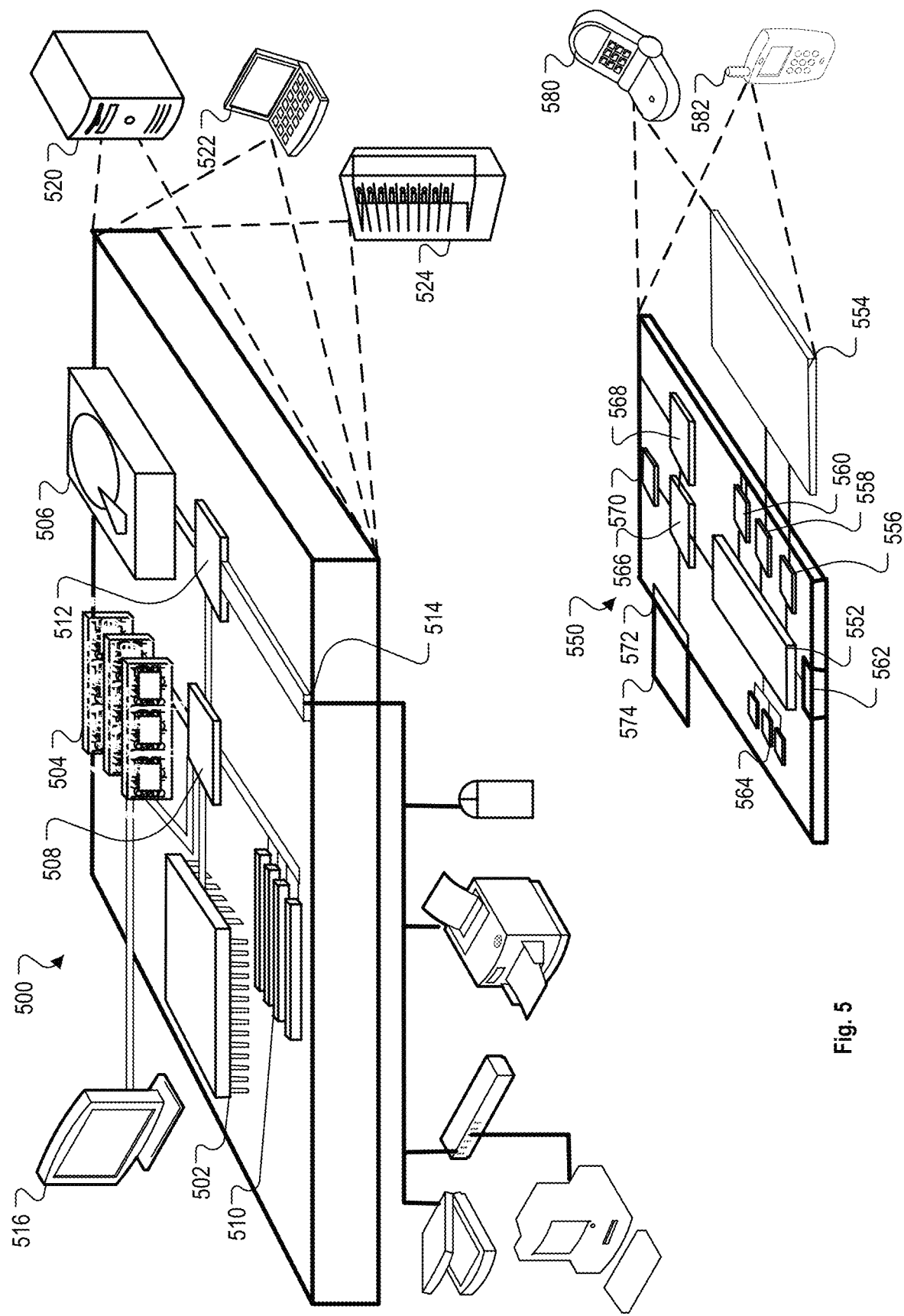
FIG. 5 shows an example of a computer device and a mobile computer device, which may be used with the techniques described here.

FIG. 5 shows an example of a computer device 500 and a mobile computer device 550, which may be used with the techniques described here. For example, the advertisement server 110, commercial web server 112, and user devices 106 shown in FIG. 1 could all be examples of a computer device 500 or mobile device 550. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the processes and techniques described herein. In an example, there are numerous other ways that the system may minimize power usage, including, e.g., performing name processing locally on a client device, performing name processing in dedicated hardware (rather than on a general purpose central processing unit), reducing a frequency at which incoming sound is processed for name recognition, processing incoming sound for name recognition when sound level is above a frequency threshold, varying the frequency threshold based on factors (e.g., time of day, input from other sensors, calendar entries, battery level, and so forth) that may predict the likelihood that the system will be addressed so as to trade off effectively between a system recall rate and power usage, and so forth.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims. Although a few implementations have been described in detail above, other modifications are possible. Moreover, other mechanisms for editing voice may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other embodiments not specifically described herein are also within the scope of the following claims.

What is claimed is:

1. A computer-implemented method comprising:

providing, by one or more first computer systems configured to implement an online service for providing advertisements, an online advertisement to a client device, wherein the one or more first computer systems are configured to automatically obtain, from the client device, data indicative of network addresses accessed by the client device without third-party cookies and independent of sending a request to one or more second computer systems;

obtaining, by the one or more first computer systems and from the client device, multiple different network addresses of a particular website that are accessed by the client device after the online advertisement is provided to the client device;

determining, by the one or more first computer systems, that the multiple different network addresses include a secure network address of a secure web page within the particular website;

determining an amount of time that the client device accessed one or more pages of the particular website; and determining, based on (i) an analysis of the amount of time the client device interacted with the one or more pages of the particular website and (ii) the determination that the client device accessed the secure network address, that a conversion has occurred while the user accessed the particular website following the online advertisement being provided to the client device, the determination being performed independent of sending a request to the one or more second computer systems for data indicative of conversions.

2. The method of claim 1, wherein determining that a conversion occurred comprises determining that the conversion occurred in the absence of statistics or other information provided by a provider of the online advertisement.

3. The method of claim 1, wherein the one or more first computer systems are further configured for automatic communication with client device software for automatically transmitting, to the one or more first computer systems, data indicative of network addresses accessed by the client device, the method further comprising providing, by the one or more first computer systems, the client device software to the client device.

4. The method of claim 1, wherein obtaining multiple different network addresses of the particular website comprises obtaining the multiple different network addresses of web pages that lack the functionality to track conversions.

5. The method of claim 4, wherein obtaining multiple different network addresses of the particular website comprises obtaining the multiple different network addresses through a browser executing at the client device.

6. The method of claim 1, wherein determining that a conversion occurred comprises determining that the conversion occurred based further on a semantic analysis of a uniform resource locator of a web page presented at the client device.

7. The method of claim 1, wherein obtaining multiple different network addresses of the particular website comprises obtaining the multiple different network addresses through a browser plug-in that extends functionality of a browser executing at the client device.

8. A system, comprising:
one or more processing devices; and
one or more non-transitory computer readable media storing instructions that are executable by the one or more processing devices to perform operations comprising:
providing, by one or more first computers configured to implement an online service for providing advertisements, an online advertisement to a client device, wherein the one or more first computers are configured to obtain, from the client device, data indicative of network addresses accessed by the client device without third-party cookies and independent of sending a request to one or more remote computer systems;
obtaining, by the one or more first computers and from the client device, multiple different network addresses of a particular website that are accessed by the client device after the online advertisement is provided to the client device;
determining, by the one or more first computers, that the multiple different network addresses include a secure network address of a secure web page within the particular website;

determining an amount of time that the client device accessed one or more pages of the particular website; and determining, based on (i) an analysis of the amount of time the client device interacted with the one or more pages of the particular website and (ii) the determination that the client device accessed the secure network address, that a conversion has occurred while the user accessed the particular website following the online advertisement being provided to the client device, the determination being performed independent of sending a request to the one or more remote computer systems for data indicative of conversions.

9. The system of claim 8, wherein determining that a conversion occurred comprises determining that the conversion occurred in the absence of statistics or other information provided by a provider of the online advertisement.

10. The system of claim 8, wherein:
the one or more first computers are configured for automatic communication with client device software for automatically transmitting, to the one or more first computers, data indicative of network addresses accessed by the client device; and
the instructions cause the one or more processing devices to perform operations further comprising providing, by the one or more first computers, the client device software to the client device.

11. The system of claim 8, wherein obtaining multiple different network addresses of the particular website comprises obtaining the multiple different network addresses of web pages that lack the functionality to track conversions.

12. The system of claim 11, wherein obtaining multiple different network addresses of the particular website comprises obtaining the multiple different network addresses through a browser executing at the client device.

13. The system of claim 8, wherein determining that a conversion occurred comprises determining that the conversion occurred based further on a semantic analysis of a uniform resource locator of a web page presented at the client device.

14. The system of claim 8, wherein obtaining multiple different network addresses of the particular website comprises obtaining the multiple different network addresses through a browser plug-in that extends functionality of a browser executing at the client device.

15. One or more non-transitory computer readable media storing instructions executable by one or more processing devices of one or more first computer systems configured to implement an online service for providing advertisements, wherein execution of the instructions by the one or more processing devices causes the one or more processing devices to perform operations comprising:
providing an online advertisement to a client device;
obtaining, from the client device, data indicative of network addresses accessed by the client device without third-party cookies and independent of sending a request to one or more second computer systems;
obtaining, from the client device, multiple different network addresses of a particular website that are accessed by the client device after the online advertisement is provided to the client device;
determining that the multiple different network addresses include a secure network address of a secure web page within the particular website;

determining an amount of time that the client device accessed one or more pages of the particular website; and determining, based on (i) an analysis of the amount of time the client device interacted with the one or more pages of the particular website and (ii) the determination that the client device accessed the secure network address, that a conversion has occurred while the user accessed the particular website following the online advertisement being provided to the client device, the determination being performed independent of sending a request to the one or more second computer systems for data indicative of conversions.

16. The method of claim 15, wherein determining that a conversion occurred comprises determining that the conversion occurred in the absence of statistics or other information provided by a provider of the online advertisement.

17. The method of claim 15, wherein the one or more first computer systems are further configured for automatic communication with client device software for automatically transmitting, to the one or more first computer systems, data indicative of network addresses accessed by the client device.

18. The method of claim 15, wherein obtaining multiple different network addresses of the particular website comprises obtaining the multiple different network addresses of web pages that lack the functionality to track conversions.

19. The method of claim 18, wherein obtaining multiple different network addresses of the particular website comprises obtaining the multiple different network addresses through a browser executing at the client device.

20. The method of claim 15, wherein determining that a conversion occurred comprises determining that the conversion occurred based further on a semantic analysis of a uniform resource locator of a web page presented at the client device.

* * * * *